UNITED STATES PATENT OFFICE.

EINAR HANSEN, OF PARIS, FRANCE.

PROCESS FOR THE CONCENTRATION OF SULFURIC ACID.

1,379,260. Specification of Letters Patent. Patented May 24, 1921.

No Drawing. Application filed September 4, 1918. Serial No. 252,652.

*To all whom it may concern:*

Be it known that I, EINAR HANSEN, a Norwegian, residing at 41 Avenue de l'Opéra, Paris, France, have invented new and useful Improvements in a Process for the Concentration of Sulfuric Acid, of which the following is a specification.

Owing to its great power of absorption, the use of sulfuric acid as a means of desiccation is very widespread in modern chemical technology. After sulfuric acid has absorbed a certain amount of water it is no longer suitable for use as a means of desiccation and must be concentrated.

The concentration of weak nitric acid by means of sulfuric acid forms one of the recent fields where it can be used as a drier, since by distilling in a suitable manner, weak nitric acid and concentrated sulfuric acid, strong nitric acid, and weak sulfuric acid is obtained, which latter must be reconcentrated. This new industry is in direct relation to the industry of the extraction of nitrogen from the air by making the air pass through an electric arc, where a part of the nitrogen and the oxygen of the air combine to form an oxid and dioxid of nitrogen. By absorption in water nitric acid of about a strength of 30 to 35% is obtained directly. It is the conversion of this intermediate product into concentrated nitric acid which forms the basis of the new use of concentrated sulfuric acid.

Concentration of weak sulfuric acid necessitates the use of heat.

The position of the industry of the extraction of nitrogen from air is sufficiently favorable from this point of view, since the air has a very high temperature (about 600°) after it has passed through the electric arc furnace. In order to take advantage of the great calorific contents of the hot gases from the furnace for the concentration of the sulfuric acid, up to the present two methods have been followed: allowing the gas to pass through a boiler system for the raising of steam, or allowing it to pass through a heating arrangement for the production of hot air.

The steam or the air thus obtained can thus be used for the concentration of the sulfuric acid. In both cases the heating is applied indirectly with consequent heat losses. In addition the costs of installation and maintenance are very high.

The present invention has for its object a new process of concentration of sulfuric acid by placing the hot gas from the furnace in direct contact with the sulfuric acid to be concentrated and by utilizing entirely as before the oxids of nitrogen contained in the furnace gas.

The invention can be carried out as follows:—

The nitrous gases are led into the lower part of a tower built of granite or other convenient material. The tower is filled with quartz or other suitable material. At the top of the tower the dilute sulfuric acid is introduced. In proportion as the sulfuric acid meets the hot gases it becomes concentrated. At the same time the sulfuric acid will absorb a part of the nitrogen oxid of the gas, but it will liberate it again when the sulfuric acid reaches the hot zone at the bottom of the tower. The operation is arranged in such a manner that the temperature at the top of the tower is sufficiently high so that the water liberated escapes in the form of steam along with the oxids of nitrogen. This mixture of steam and nitric gas can consequently be led directly to an absorption system; in many cases it would be more advantageous to allow the mixture to pass through a condensing plant before absorption, to permit of the condensation of the steam while eliminating the useless heating of an absorption system. As the cooling agent, one could for example use the weak acid coming from the absorption system. The water used in the refrigeration is led to the absorption system with the condensed water.

It is assumed that the process described in the foregoing for the carrying out of the invention is to be considered solely as an example, it being understood that the process can be varied in many ways without modifying the idea of the invention.

I claim:

1. The process of concentrating sulfuric acid which consists in bringing into direct contact with the sulfuric acid hot gas containing nitric oxid, subjecting the gas resulting therefrom to condensation and then conducting it into an absorption system for nitrous gas of a well-known kind.

2. The process as set forth in claim 1, in which the mixture of the condensation water and the cooling liquid used for the condensation is used for the absorption of nitrous gases.

In testimony whereof I have signed my name to this specification in the presence of two subscribing witnesses.

EINAR HANSEN.

Witnesses:
RANDOLPH H. BARKSDALE,
PIERRE A. JEANNOT.